2,992,128
RECORD MEMBERS TO PROVIDE A VISIBLE TRACE OF MOVEMENT OF A MECHANICAL STYLUS
Bernard Vonnegut, Scituate, Mass., assignor to Arthur D. Little, Inc., Cambridge, Mass., a corporation of Massachusetts
No Drawing. Original application Feb. 4, 1955, Ser. No. 486,069. Divided and this application Apr. 30, 1956, Ser. No. 581,732
3 Claims. (Cl. 117—29)

This invention relates generally to members having record sustaining layers through which a mechanical stylus may move to trace out a visible record of the stylus movement. More particularly, this invention relates to record receiving members of the above character which are particularly suitable for use with recording apparatus which has a recording instrument providing only a small energy output to deflect the stylus and/or has a record driving means providing only a small energy output to drive the record member so as to develop a time base for the stylus trace.

This application is a division of my copending application, Serial No. 486,069, filed February 4, 1955, now U.S. Patent 2,897,038 issued July 28, 1959.

Low energy recording apparatus of the type mentioned is highly advantageous, since, for example, the apparatus in the recording of small value physical quantities may be operated directly by the quantity recorded, thus obviating the bulk, expense and other drawbacks inherent in the commonly necessary components interposed between the source of the quantity and the recording instrument itself. Also, such low energy recording apparatus is of great advantage in that it eliminates the necessity for bulky, expensive and complex arrangements for driving the recording medium during recording.

The prior art, however, has failed to develop a satisfactory low energy recording apparatus. This is so, since ordinary recording instruments require an energy output, higher by several orders of magnitude than that contemplated by the invention, in order to satisfactorily overcome the high frictional loading present in the usual recording apparatus. Moreover, it has been necessary in the prior art, in order to overcome this same frictional loading, to use energy in driving the record which is greater by several orders of magnitude than that contemplated by the invention.

It is an object of this invention to provide record members which are adapted for use with recording instruments which provide only a low energy output to deflect the stylus, and/or adapted for use with a record driving means which provides only a small energy output for driving the record.

Another object of the invention is to provide record members having particulate record sustaining layers whose particles may be fixed in place after recording.

For a better understanding of the invention and of how the above-listed objects are realized in accordance with the invention, reference is made both to the following description of a representative embodiment of the invention, and to the accompanying typographically constructed figure which appears directly below.

Record plate 84 for recording apparatus

| Record sustaining layer 104 of nonmetallic particles of, say, carbon black or ZnO or MgO. |
| - - - - - - Anti-friction surface 101 - - - - - - |
| Normally hard but selectively softenable, transilluminable plastic layer 103 of, say, nitrocellulose (part of underbody 100 for layer 104). |
| Transilluminable base 102 of, say, glass (part of underbody 100 for layer 104). |

The record plate 84 disclosed herein is adapted to be used with, for example, the recording apparatus which is described in detail in the aforementioned U.S. Patent 2,897,038, and of which the recording instrument component is comprised of a needle tip stylus, a sensing means having a sensitive element mounted in bearings, and a stylus arm means coupling the stylus to the sensitive element to provide for angular deflection of the former according to the value of a physical quantity sensed by the latter. The sensing means itself may be considered to be comprised of the sensitive element and a means affording a resilience force which opposes deflection of the element in accordance with the amount of angular deflection thereof.

The remaining principal component of the recording apparatus is a motor means for moving the record member 84 during recording. In the mentoined patent this motor means takes the form of a conventional spring driven pocket watch operative by an escapement movement. The hands of the watch have been removed and a record member mounting means in the form of a small turntable has been mounted on the hour hand shaft of the watch. Thus the running of the watch rotates the turntable one revolution in every twelve hours.

Coming now to a description of the record member 84 itself, such record member may be adapted in shape to the circumstances of application. Thus it may be a record plate of rectangular form similar to the glass slides used in a microscope stage. In the mentioned patent it takes the form of a disk of 5 cm. diameter at the most mounted on the turntable in centered relation therewith by three set screws which pass from enlarged heads thereof down through bored holes in the record plate and into threaded holes in the turntable. Alternatively, the record plate may be secured to the turntable by adhesive.

To provide for generation of a trace on record plate 84 under the low friction force conditions hereafter described, the mentioned record plate has a characteristic general structure which is shown in the above figure. As shown, the record plate has, as one component, a dimensionally stable underbody 100, the underbody having a surface 101 characterized by a smooth finish. Thus, the underbody 100 may consist of a glass base member 102 overlaid by a layer 103 of an organic plastic material which is normally hard but which is softenable with appropriate treatment. Layer 103 may be composed of nitrocellulose, a normally hard plastic material which softens when exposed for a time to acetone vapor. Other normally hard plastic materials softenable with appropriate treatment may be used, as, say, a material which is normally hard at room temperature but which softens under elevated temperature. Whatever the material used, the smooth finish surface 101 is represented by the outer surface of the plastic layer 103.

In addition to the underbody 100, the record plate 84 has another component in the form of a layer of record sustaining material adhering to the smooth finish surface 101. Further, this record sustaining layer is a shear-complaint layer, the term "shear-complaint" being used to indicate (1) that the layer opposes with negligible mechanical strength the shearing action of a stylus inscribing a trace therein, and (2) that the layer is mechanically weak beyond the point where it is able to guide a stylus in a trace formed therein. The shear compliance property of the record sustaining layer is in part given thereto by the material of which the layer is composed. According to the present invention the layer material is incohesive in nature compared with, say, metallic materials such as silver or the plastic materials used in ordinary phonograph records. The composition of the material may differ, however. Thus, preferably the record sustaining layer, takes the form of an extremely thin film 104 of finely divided carbon particles (lamp black) which are deposited by aerosol deposit to adhere loosely on the surface 101. However, the film 104 may also be composed of other materials in finely divided particulate form, as, say, a film 104 composed of finely divided particles of zinc oxide or magnesium oxide.

The record plate of the present invention is adapted to provide a record trace which optically stands out in sharp contrast to the background. This sharp contrast effect is obtained by transillumination, and for this purpose the underbody 100 in these record plates is transparent while the film 104 is at least partially opaque by virtue of being comprised of particles which are opaque in appearance because of light absorption or light scattering or another optical phenomenon causing opaqueness.

Enlarging upon the characteristics of the film 104, the particles within the film are preferably of one micron size at the most and are distributed over the surface 101 in a dispersion which is preferably of single particle thickness. Also in film 104, the component particles thereof are present therein in a dispersion which is preferably sufficiently sparse that when, as in the present embodiment, opaque particles are used, the film 104 passes 50% at the least of the light transmitted through the transparent underbody 100. Because of the extreme thinness of the film and the scantiness of particles therein, the film 104, as later more fully described, presents a very low mechanical resistance to movement of a stylus therethrough.

Since the particles of film 104 are in loosely adhering relation with the surface 101, there is a tendency with improper handling of the record plate 84 for the mentioned film to become smudged so that the record thereon is marred. This problem may be adequately coped with by the form of record plate shown in the figure. After a record trace has been inscribed by a stylus in film 104, this record plate is treated to soften the underlying layer 103 of plastic material. For example, if, as mentioned, the layer 103 is composed of nitrocellulose, this layer may be softened by exposing the record plate to acetone vapor. When layer 103 is so softened, the finely divided particles in the film 104 sink into the surface 101 to become imbedded in the plastic material. Thereafter the plastic in 103 is permitted to reharden with the result that the record trace in film 104 is permanently fixed on the record plate.

As mentioned, the underbody 100 is composed of transparent material while the film 104 is composed of opaque material. Accordingly, although the stylus inscribes in film 104 a record trace of extreme fineness, as, say, ten microns width at the most, the record trace is, optically, very pronounced. Thus, the presently described record plates may be used in place of micro film to preserve record traces in a form subject to ready reproduction and/or enlargement by photographic or other optical means.

It will be appreciated that the record plate provided for in accordance with the record plate provided for in accordance with the present invention is characterized by a number of advantages not present in ordinary recording mediums. For example, the presently described record plate is light in weight, has a minimal area, to give ease in storage and handling, and is dimensionally stable with resulting freedom from damage by creasing or the like. Another extremely important advantage of the presently described record plate will be brought out in the discussion to follow.

Having described an illustrative embodiment of a record plate according to the present invention, it is now necessary to consider the aspects of that record plate which make possible the operation of a recorder with a sensitive element and with a record driving motor means, both of which components have an extremely low energy output. As a simplified explanation of why the described record plate so makes possible the operation of such a recording apparatus, in the forces involved in the recording operation are given by the expression:

$$f = kd \qquad (1)$$

where, in linear terms, $f$, for any stylus displacement from zero towards full scale, is the linear deflection force exerted on the stylus by the sensitive element, $d$ is the value of the concurrent stylus displacement from zero position, and $k$ is the restoring coefficient of the resilience force opposing increased stylus displacement. The energy expression of interest is, in linear terms:

$$W = \tfrac{1}{2} FD \qquad (2)$$

where W is the total work done by the sensitive element against the opposing resilience force in moving the stylus from zero to full scale displacement and F and D are, the full scale values of $f$ and $d$. In angular terms Expression 2 becomes:

$$W = \tfrac{1}{2} TA \qquad (3)$$

where T is the deflecting torque exerted by the sensitive element at full scale angular deflection thereof, and A is the amount of angular deflection undergone by the stylus and sensitive element from zero to full scale deflection.

From Expression 2 it is clear that reduction of either of the quantities F or D will permit the work capacity required of the sensitive element to be reduced. In other words by reducing one or both of these quantities by several orders of magnitude below the usual employed value, it is possible to use a sensitive element of such lower energy output capacity that it differs in kind from the various stylus deflecting means hitherto employed in recording apparatus.

Considering reduction of F, the recording instrument, for any position in its displacement range, experiences a loading of drag force $f_1$ opposing the deflecting force $f$. This loading force $f_1$ is substantially constant over the whole displacement range, will be highest when the stylus is static, and, in general, represents the sum of the frictional drag $f_b$, of the bearings, and the drag $f_s$, of the recording surface on the stylus. For simplicity, unless otherwise mentioned, it is assumed hereafter that $f_s$ represents the entire drag force on the recording instrument.

In order to overcome the drag force $f_s$ on the stylus when it is static at a given displacement position $d'$ therefor, the deflecting force must increase from the theoretically proper value $f'$ for the deflecting force at $d'$ by an increment $\delta f$ which more than equals $f_s$. It follows although the deflecting force increases by as much as $\delta f$, that the stylus does not move to its theoretically correct displacement position for the force value $f' + \delta f$, but instead remains static at $d'$ to indicate an apparent force of $f'$. A discrepancy so arising between the theoretically correct and actual positions of the stylus represents a displacement error, $\delta d$ which in absolute distance units has a value given by the expression:

$$f_s = K\delta d \quad (4)$$

In recording, however, in order to get a significant figure for the accuracy of recording, it is necessary to relate the absolute error in displacement to the entire displacement in whch the error exists. One such figure which is representative of overall recording performance is the relative error at full scale displacement, this relative error being designated by the term $m$, having a value given by the ratio expressions:

$$m = \frac{\delta d}{D} = \frac{K\delta d}{KD} = \frac{f_s}{F}$$

$$(5) \quad (6) \quad (7)$$

The value of $m$ is usually fixed by design considerations. For example, the relative error at full scale may be required for certain applications to be no more than 1% in percentage terms. With $m$ so fixed it is seen from Expression 7 that, to attain the objective of drastically reducing F in order to correspondingly reduce the energy output required of the sensitive element it is first necessary that the stylus drag force $f_s$ be drastically reduced.

To the end of so reducing $f_s$, it is clear that it is desirable to make more shear compliant, the material in which the stylus inscribes its trace. If such material is extremely shear compliant, however, it has no mechanical strength of its own so that it is unable to hold its shape. This problem is met according to the present invention by providing, as a part of the record member, the mentioned dimensionally stable underbody, which in addition to supporting the shear compliant layer has a number of hitherto mentioned advantages as well.

As another consideration pertinent to the reduction of $f_s$, it has previously been thought desirable, in order to get a better trace, that a relatively thick layer of record sustaining material be used. With such thick layer, the stylus contact pressure must be high enough to prevent "skipping" of the stylus as a result of being "wedged-up" by the layer during recording. Moreover, with this thick layer and with a contact pressure of a value selected to prevent skipping while at the same time not being unnecessarily heavy on the record, the drag force $f_s$ has been largely independent of the contact pressure but has been relatively high. This high value for $f_s$ can be attributed to the fact that the drag on the stylus is caused primarily by the force necessary to cut through the thick layer rather than by the much lesser frictional force exerted by the smooth finish surface of the underbody on the stylus as the stylus moves over this surface.

It has been discovered, according to the present invention, that the thickness of the record sustaining layer can be drastically reduced while, nevertheless, a satisfactory trace is still obtained. It has also been discovered as an inobvious phenomenon that when the layer is reduced in thickness below a critical value, which is in turn no less than the layer thickness contemplated by the present invention, the stylus drag force $f_s$ becomes substantially independent of layer thickness and, instead, is determined almost exclusively by the coefficient of friction between the stylus and the smooth finish surface of the underbody. As a result of this feature of having the underbody surface rather than the record sustaining layer determine the frictional drag on the stylus, the force $f_s$ for a given contact pressure may be greatly reduced over that obtaining with ordinary recording conditions since the friction drag occasioned substantially entirely by the underbody surface is much less than the drag occasioned substantially entirely by a thick layer having a trace inscribed therein. Of course, however, with the underbody surface causing substantially all of whatever stylus drag there is, the drag force $f_s$, being primarily a friction phenomenon, will vary with the contact pressure.

The described reduction in layer thickness below critical value has a two-fold advantage in that, not only, as described, is the drag of the layer reduced to negligible value, but in addition, the stylus contact pressure may be greatly reduced in value while still being productive of a satisfactory trace. This fact is so, since the layer when so reduced has little tendency to "wedge-up" the stylus to cause it to skip over the record. Hence no extra contact pressure is needed to overcome this wedging tendency, and the pressure may be reduced to that minimal amount necessary to assure no more than a reliable contact between the stylus and the underbody surface.

When the contact pressure is so reduced, the stylus drag force $f_s$, being equal to the product of the contact pressure and a friction coefficient, is correspondingly reduced. Moreover, with regard to this relation by a friction coefficient of $f_s$ to the contact pressure, it has been discovered as an unexpected phenomenon, that for very low contact pressures, as, say, less than 0.2 dyne, the friction coefficient itself decreases to further supplement the decrease in the stylus drag force as the contact pressure decreases.

As an additional discovery of significance, it has been found that when the surface 101 of the underbody is the surface of the plastic layer 103, the force $f_s$ is reduced to less than one-third of that present if the surface 101 were to be merely a glass surface.

In connection with the considerations discussed above for reducing $f_s$, the following table sets forth experimental results obtained with different record sustaining surfaces in contact, under a pressure from 0.1 to about 1 dyne with a needle tip stylus leaving a trace of 10 micron width at the most upon the surface.

| Surface: | Static friction coefficient |
|---|---|
| Clean glass | 1.0 |
| Lightly coated glass | 1.5 |
| Medium coated glass | 2.0 |
| Nitrocellulose covered glass | .31 |
| Nitrocellulose covered glass lightly coated | 1.1 |

From the foregoing it will be seen that by use of a record member having a shear compliant layer of very low thickness on a dimensionally stable underbody, and by the further use of means giving a very low contact pressure of the stylus with the record, the drag force $f_s$ may be reduced by several orders of magnitude from that value common to conventional recorders. As to specific values, it is preferable that the record sustaining layer and the underbody surface of the record member have, respectively, such sufficiently low shear compliance-thickness characteristic and such sufficiently low friction characteristic that the record member has a static mechanical resistance of one dyne at the most to a needle tip stylus in contact with the record member under 0.1 dyne pressure and leaving a trace therein of 10 microns width at the most. Also, as an independent specific value, it is preferable that the stylus contact pressure is of one dyne value at the most. It will be realized that a contact pressure of this minimal value is made possible by the construction of the stylus arm means described above.

It should be kept in mind that the foregoing discussion has been concerned with static conditions, and that, when the stylus is moving, the drag force $f_s$ thereon is substantially reduced, probably to less than ½ of the static force.

With $f_s$ so reduced in magnitude it is seen from Expression 7 where the ratio $f_s/F$ is equated to the quantity $m$, assumed fixed in value, that the maximum stylus deflecting force F may be correspondingly reduced. It follows from Expression 2 that the present invention permits use of a recording instrument with very low energy output capacity.

As one more note of interest, since the stylus contact pressure is so low the thrust upon the bearings for the sensitive element is minimized. Accordingly, the low contact pressure not only reduces the $f_s$ component of the total loading force $f_1$ on the sensitive element, but also reduces the component $f_b$ as well.

So far the discussion has been confined to reduction of the loading force on the recording instrument. It will be seen however, that the force $f_s$ also represents a load upon the record member drive means. Hence by drastically reducing $f_s$ as described, it is possible to use a very low energy driving means as, say, the previously mentioned pocket watch.

In connection with Expression 2 it was stated that the energy output capacity required of the sensitive element could be reduced either by reducing F or by reducing D. Considering now reduction of the sensitive element energy output by way of reducing D, this reduction will not affect the value of either the stylus drag force $f_s$ or the full scale deflection force F. Hence, it will be seen, by comparison of the ratios (5) and (7), that reduction of D has no effect upon the recording error arising from friction loading, since as D decreases the value $\delta d$ (representing absolute displacement error from friction) decreases proportionately. In fact, the value D may be reduced until the proportionately decreasing value $\delta d$ becomes of the same order of size as the width of the trace left by the needle tip stylus. At this point in the reduction the error arising from difficulty in accurately reading the trace approaches and may exceed the mechanical error arising from friction. Hence, there is no advantage in further reducing D.

With regard to the mode of reducing D, in Expressions 6 and 7 the numerator of ratio (6) equals the numerator of ratio (7), and the denominator of ratio (6) equals the denominator of ratio (7). Hence it will be seen, with an assumed constant value for F, that the value D bears an inverse relation to the value of K, the restoring coefficient, and that D will be decreased by increasing K. When K is so increased to decrease D, from Expression 2 the output energy required of the ensitive element will be decreased. Thus, there is established the rather surprising result that by increasing the stiffness of the restoring means by, say, a tenfold factor, the output energy required of the sensitive element is decreased to one tenth of that necessary heretofore.

It will be appreciated that the above described record plate permits the use of recording apparatus of great versatility of application. For example, as a result of its low energy requirements, the apparatus may be operated from a flashlight battery source for a period of as long as six months. Thus, when the record driving means is also operated from the flashlight battery source, the apparatus may be used for long periods without attention to record events occuring at geographically isolated recording stations. Moreover, since the recording apparatus may be in the form of a combination of very low cost components, the apparatus may be used as an expendable unit which is placed, say, in packing crates to record conditions in the crate during a journey, the apparatus being discarded at the end of the journey.

The described embodiment being illustrative only, it will be appreciated that the present invention comprehends organizations differing in form or detail from the presently described embodiment. Accordingly, the invention is not to be considered as limited save as is consonant with the scope of the following claims.

I claim:

1. A record member adapted to provide a record of movement of a mechanical stylus, said record member comprising, a transilluminable base member having a glassy smooth surface, a thin, transilluminable coating adherent on said surface and itself having an outer surface of smooth finish adapted to provide a low friction bearing surface for said stylus, a record sustaining layer which is comprised of an internally incohesive deposit of fine size opaque non-metallic particles adhering loosely to said stylus bearing surface, and which is adapted to have such stylus moved therethrough while in contact with said bearing surface to provide a trace in said layer of said movement, said coating being comprised of a synthetic resinous, transilluminable material which is normally hard to render said coating surface hard when providing support for said loosely adhering particles and said stylus, but which is softenable by contact with a solvent thereof, and which is adapted by softening and by subsequent rehardening thereof, after said trace has been formed in said layer, to render said particles firmly imbedded in said coating to thereby fix said trace, and said base member being comprised of hard transilluminable material which is adapted to remain unsoftened and dimensionally stable during the softening of said organic plastic material.

2. A record member adapted to provide a record of movement of a mechanical stylus, said record member comprising, a transilluminable base member having a glassy smooth surface, a thin, transilluminable coating adherent on said surface and itself having an outer surface of smooth finish adapted to provide a low friction bearing surface for said stylus, a record sustaining layer which is comprised of an internally incohesive deposit of fine size opaque non-metallic particles adhering loosely to said stylus bearing surface, and which is adapted to have such stylus moved therethrough while in contact with said bearing surface to provide a trace in said layer of said movement, said coating being comprised of a synthetic resinous, transilluminable material which is normally hard to render said coating surface hard when providing support for said loosely adhering particles and said stylus, but which is softenable by special treatment and which is adapted by softening in such manner and by subsequent rehardening thereof, after said trace has been formed in said layer, to render said particles firmly imbedded in said coating to thereby fix said trace, and said base member being comprised of hard transilluminable material which is adapted to remain unsoftened and dimensionally stable during the softening of said organic plastic material.

3. A record member adapted to provide a record of movement of a mechanical stylus, said record member comprising, a transilluminable base member having a glassy smooth surface, said base member being comprised of hard, dimensionally stable material, a thin, transilluminable coating adherent on said surface and itself having an outer surface of smooth finish adapted to provide for said stylus a bearing surface characterized by a lower coefficient of friction with said stylus than the coefficient of friction between said stylus and the glassy smooth surface of said base member, said coating being comprised of a, transilluminable, synthetic resinous material, and a record sustaining layer which is comprised of an internally incohesive deposit of fine size opaque non-metallic particles adhering loosely to said stylus bearing surface, and which is adapted to have such stylus moved therethrough while in contact with said bearing surface to provide a trace in said layer of said movement, the said material of said coating being hard to render said coating surface hard when providing support for said loosely adhering particles and said stylus.

References Cited in the file of this patent

UNITED STATES PATENTS

| | | |
|---|---|---|
| 748,918 | Bristol | Jan. 5, 1904 |
| 1,645,534 | Judkins | Oct. 18, 1927 |
| 1,895,711 | Foley | Jan. 31, 1933 |
| 1,919,517 | Konishi | July 25, 1933 |
| 2,087,711 | Mayall | July 13, 1937 |
| 2,297,691 | Carlson | Oct. 6, 1942 |
| 2,662,828 | Dubusc | Dec. 15, 1953 |
| 2,702,254 | Dowd | Feb. 15, 1955 |
| 2,726,168 | Roddin et al. | Dec. 6, 1955 |
| 2,776,907 | Carlson | Jan. 8, 1957 |
| 2,798,821 | Lehmann | July 9, 1957 |
| 2,897,038 | Vonnegut | July 28, 1959 |
| 2,935,369 | Mignone et al. | May 3, 1960 |

UNITED STATES PATENT OFFICE
CERTIFICATE OF CORRECTION

Patent No. 2,992,128                                       July 11, 1961

Bernard Vonnegut

It is hereby certified that error appears in the above numbered patent requiring correction and that the said Letters Patent should read as corrected below.

Column 2, line 29, for "mentoined" read -- mentioned --; column 3, line 5, for "complaint", each occurrence, read -- compliant --; column 4, lines 3 and 4, strike out "the record plate provided for in accordance with"; line 22, strike out "in"; column 5, line 8, for "whch" read -- which --; column 7, line 37, for "ensitive" read -- sensitive --; column 8, line 67, for "2,087,711" read -- 2,087,111 --.

Signed and sealed this 28th day of November 1961.

(SEAL)
Attest:

ERNEST W. SWIDER                                DAVID L. LADD
Attesting Officer                                  Commissioner of Patents

USCOMM-DC